United States Patent
Ghannam et al.

(10) Patent No.: US 12,142,022 B2
(45) Date of Patent: Nov. 12, 2024

(54) BIOMETRIC AUTHORIZATION

(71) Applicant: Ford Global Technologies, LLC, Dearborn, MI (US)

(72) Inventors: Mahmoud Yousef Ghannam, Canton, MI (US); Brian Bennie, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 376 days.

(21) Appl. No.: 17/590,867

(22) Filed: Feb. 2, 2022

(65) Prior Publication Data

US 2023/0281949 A1    Sep. 7, 2023

(51) Int. Cl.
 *G06V 10/44* (2022.01)
 *B60R 25/25* (2013.01)
 *G06V 40/16* (2022.01)

(52) U.S. Cl.
 CPC .......... *G06V 10/443* (2022.01); *G06V 40/172* (2022.01); *B60R 25/25* (2013.01)

(58) Field of Classification Search
 CPC ...... G06V 10/44; G06V 10/443; G06V 40/16; G06V 40/172; B60R 25/25; G06F 21/32; G06F 21/60; G06F 21/604; G06F 2221/2141
 See application file for complete search history.

(56) References Cited

U.S. PATENT DOCUMENTS

| | | | |
|---|---|---|---|
| 9,346,400 B2 * | 5/2016 | Attard | B60W 30/00 |
| 9,663,112 B2 | 5/2017 | Abou-Nasr et al. | |
| 9,760,785 B2 * | 9/2017 | Kursun | G06V 40/70 |
| 9,967,747 B2 | 5/2018 | Rotter et al. | |
| 10,114,935 B2 * | 10/2018 | Das | H04L 63/0861 |
| 10,115,185 B2 * | 10/2018 | Gibbon | G06V 20/10 |
| 10,573,171 B2 * | 2/2020 | VanBlon | G08C 17/02 |
| 11,151,481 B1 * | 10/2021 | Sun | G06V 40/161 |
| 11,157,723 B1 | 10/2021 | Shah et al. | |
| 11,163,862 B2 | 11/2021 | Barillari et al. | |
| 11,356,640 B2 * | 6/2022 | Astarabadi | H04N 7/147 |
| 11,388,167 B2 * | 7/2022 | Boodaei | H04L 63/0838 |
| 11,501,542 B2 * | 11/2022 | Dinh | G06V 10/56 |
| 11,606,690 B1 * | 3/2023 | Robinson | H04W 12/069 |
| 11,809,535 B2 * | 11/2023 | Magi | G06V 40/70 |

(Continued)

*Primary Examiner* — Edward F Urban
*Assistant Examiner* — Benedict E Lee
(74) *Attorney, Agent, or Firm* — Frank Lollo; Bejin Bieneman PLC

(57) ABSTRACT

Upon determining a confidence score for challenge biometric data for a user of an object is less than a first confidence threshold, a confirmation confidence score for the challenge biometric data is determined based on a remote confidence score for the challenge biometric data received from a remote computer. Upon determining that the confirmation confidence score is greater than a second confidence threshold, a user status of the user is determined based on an authenticator. The user status is one of authorized or not authorized. The second confidence threshold is less than the first confidence threshold. Upon determining that the confirmation confidence score is less than or equal to the second confidence threshold, the user status is determined based on supplemental biometric data. Object components are controller based on the user status.

20 Claims, 8 Drawing Sheets

(56) References Cited

U.S. PATENT DOCUMENTS

2020/0406859 A1    12/2020  Hassani
2023/0164570 A1*   5/2023  Khandare ............. H04W 12/63
                                                            726/6

* cited by examiner

BIOMETRIC AUTHORIZATION

BACKGROUND

A computer performing biometric authorization can receive sensor data to determine an identity of a person seeking authorization for access to be granted by the computer. Biometric authorization can include, for example, facial recognition, a type of biometric authorization where an image of a human face is used to identify a person. Biometric authorization can rely upon acquiring accurate biometric data.

DETAILED DESCRIPTION

Figure 1A:
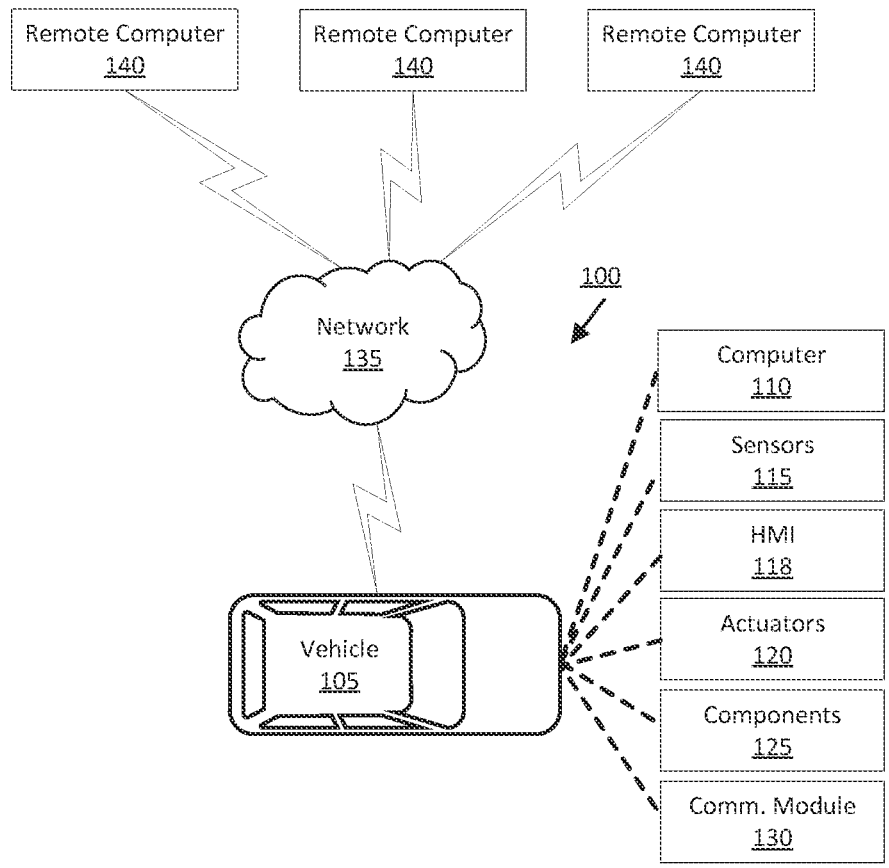
FIG. 1A is a block diagram illustrating an example control system for a vehicle.

Biometric authorization can be used by a computer to control access to devices, objects, and/or applications, e.g., to vehicles, buildings, computers, cell phones, other devices, etc. For example, biometric authorization can be implemented to permit authorized people to access, e.g., to a vehicle or building, and to deny access to unauthorized people. Biometric authorization may require that a user provide one or more types of biometric data and/or to provide the biometric data in a specific manner, e.g., in a specified sequence, to a specified sensor, etc., to generate user data that can be used to determine authorization. Biometric data is data representing measurements of physiological characteristics. A type of biometric data is data representing a specific physiological characteristic, e.g., distances between ridges in a fingerprint, distances between facial features, etc. Biometric authorization can authorize users by comparing the biometric data provided by the user to biometric data subsequently obtained via sensors in the vehicle, building, computing device, etc.

The results of performing the biometric authorization can be downloaded to a device granting or denying authorization and permission to access an object, for example, a device, a vehicle, a building, a room, a gated area, etc. Successful authorization can be used for security applications such as access to a location, e.g., a passenger cabin of a vehicle, a room, a building, etc., by unlocking a door. In other examples, successful authorization can be used to enable vehicle or building controls, or yet further alternatively or additionally access to a device such as a computer by enabling input devices, like a keyboard or mouse, or granting access to computer files.

Authorizing users for vehicles will be described herein as a non-limiting example of biometric authorization. That is, a vehicle will be described herein as a non-limiting example of an object. It is to be understood that other types of objects, e.g., a device, a building, a garage, a gated area, etc., could utilize the techniques described herein for biometric authorization.

Vehicles can be equipped with computing devices, networks, sensors, and controllers to acquire and/or process data regarding the environment and to permit access to the vehicle based on the data. For example, a camera in a vehicle can be programmed to acquire an image of an approaching user and, upon determining the identity of the user based on biometric authorization, e.g., via facial recognition software, unlock a door to permit the user to enter a passenger cabin of the vehicle. Likewise, cameras included in the passenger cabin of the vehicle can acquire one or more images of a user and, upon determining the identity of the user based on biometric authorization, e.g., via facial recognition software, accept commands from the user to operate the vehicle.

During biometric enrollment (as discussed below), the vehicle computer can obtain enrollment biometric data via interior sensors. At a future time, the vehicle computer can obtain challenge biometric data (as discussed below) via external sensors. Due to packaging constraints, the interior sensors and the exterior sensors may have different parameters (e.g., physical characteristics such as resolution, sensing media, size, shape, etc.) and/or capabilities, which may increase a likelihood of an authorized user failing biometric authorization and/or an unauthorized user passing biometric authorization. For example, interior sensors may have a different shape of lens than exterior sensors, which results in the fields of view of the respective sensors being different. As another example, interior sensors may acquire color image data and the exterior sensors may acquire infrared image data. Additionally, environmental conditions inside the passenger cabin may vary from environmental conditions outside the passenger cabin, which can also increase a likelihood of an authorized user failing biometric authorization and/or an unauthorized user passing biometric authorization.

Advantageously, upon determining that a confidence score for the challenge biometric data is less than a first confidence threshold, the vehicle computer can determine a confirmation confidence score for the challenge biometric data based on a remote confidence score for the challenge biometric data received from a remote computer. The vehicle computer can then determine a user status of the user based on (a) an authenticator when the confirmation confidence score is greater than a second confidence threshold, or (b) supplemental biometric data when the confirmation confidence score is less than or equal to the second confidence threshold. Determining the user status using the confirmation confidence score when the confidence score was less than the first confidence threshold allows the vehicle computer to biometrically authorize the user while accounting for different features between the sensors and the environmental conditions around the sensors, which can reduce the likelihood of an authorized user failing biometric authorization and being denied access to the vehicle. Additionally, determining the user status based on supplemental biometric data when the confirmation confidence score is less than the second threshold allows the vehicle computer to reduce a likelihood of an unauthorized user passing biometric authorization and gaining access to the vehicle.

A system, comprising a computer including a processor and a memory, the memory storing instructions executable by the processor to, upon determining a confidence score for challenge biometric data for a user of an object is less than a first confidence threshold, determine a confirmation confidence score for the challenge biometric data based on a remote confidence score for the challenge biometric data received from a remote computer. The instructions further include instructions to, upon determining that the confirmation confidence score is greater than a second confidence threshold, determine a user status of the user based on an authenticator. The user status is one of authorized or not authorized, and the second confidence threshold is less than the first confidence threshold. The instructions further include instructions to, upon determining that the confirmation confidence score is less than or equal to the second confidence threshold, determine the user status based on supplemental biometric data. The instructions further include instructions to control object components based on the user status.

The instructions can further include instructions to determine the user status is authorized based on the confidence score being greater than or equal to the first confidence threshold.

The instructions can further include instructions to determine the user status is not authorized based on the confidence score being less than or equal to the second confidence threshold.

The instructions can further include instructions to determine the user status is authorized based on the confirmation confidence score being greater than or equal to the first confidence threshold.

The instructions can further include instructions to determine the first confidence threshold or the second confidence threshold based on a location of the object.

The instructions can further include instructions to determine the first confidence threshold or the second confidence threshold based on a time of day.

The instructions can further include instructions to determine the first confidence threshold or the second confidence threshold based on environmental conditions around the object.

The instructions can further include instructions to provide, to a plurality of remote computers, a request for respective remote confidence scores in response to determining the confidence score is less than the first confidence threshold, wherein the plurality of remote computers includes the remote computer.

The instructions can further include instructions to determine the confirmation confidence score based additionally on a number of remote confidence scores received from the plurality of remote computers and a number of remote computers.

The instructions can further include instructions to request a response from the remote computer based on the confirmation confidence score being less than or equal to the second confidence threshold.

The instructions can further include instructions to determine the user status based on the response.

The instructions can further include instructions to determine at least one of the first confidence threshold or the second confidence threshold based on a user input.

The instructions can further include instructions to, upon determining that the user status is authorized, permit the user to access the object.

The instructions can further include instructions to determine the user status is authorized based on detecting the authenticator.

The instructions can further include instructions to determine the user status is not authorized based on detecting an absence of the authenticator.

The instructions can further include instructions to determine the user status is authorized based on determining a confidence score for the supplemental biometric data is greater than or equal to a third confidence threshold. The third confidence threshold is greater than the first confidence threshold.

The instructions can further include instructions to determine the user status is not authorized based on determining a supplemental confidence score for the supplemental biometric data is less than a third confidence threshold. The third confidence threshold is greater than the first confidence threshold.

A method includes, upon determining a confidence score for challenge biometric data for a user of an object is less than a first confidence threshold, determining a confirmation confidence score for the challenge biometric data based on a remote confidence score for the challenge biometric data received from a remote computer. The method further includes, upon determining that the confirmation confidence score is greater than a second confidence threshold, determining a user status of the user based on an authenticator. The user status is one of authorized or not authorized, and the second confidence threshold is less than the first confidence threshold. The method further includes, upon determining that the confirmation confidence score is less than or equal to the second confidence threshold, determining the user status based on supplemental biometric data. The method further includes controlling object components based on the user status.

The method can further include determining the first confidence threshold or the second confidence threshold based on at least one of a location of the object, a time of day, or environmental conditions around the object.

The method can further include, upon determining that the user status is authorized, permitting the user to access the object.

Further disclosed herein is a computing device programmed to execute any of the above method steps. Yet further disclosed herein is a computer program product, including a computer readable medium storing instructions executable by a computer processor, to execute an of the above method steps.

With reference to FIGS. 1-4, an example control system 100 includes a vehicle 105. A vehicle computer 110 in the vehicle 105 receives data from sensors 115. The vehicle computer 110 is programmed to, upon determining a confidence score for challenge biometric data for a user of an object is less than a first confidence threshold, determine a confirmation confidence score for the challenge biometric data based on a remote confidence score for the challenge biometric data received from a remote computer. The vehicle computer 110 is further programmed to, upon determining that the confirmation confidence score is greater than a second confidence threshold, determine a user status of the user based on an authenticator. The user status is one of authorized or not authorized. The second confidence threshold is less than the first confidence threshold. The vehicle computer 110 is further programmed to, upon determining that the confirmation confidence score is less than or equal to the second confidence threshold, determine the user status based on supplemental biometric data. The vehicle computer 110 is further programmed to control object components based on the user status.

Turning now to FIG. 1, the vehicle 105 includes the vehicle computer 110, sensors 115, actuators 120 to actuate various vehicle components 125, and a vehicle 105 communication module 130. The communication module 130 allows the vehicle computer 110 to communicate with remote computers 140, and/or other vehicles, e.g., via a messaging or broadcast protocol such as Dedicated Short Range Communications (DSRC), cellular, and/or other protocol that can support vehicle-to-vehicle, vehicle-to infrastructure, vehicle-to-cloud communications, or the like, and/or via a packet network 135.

The vehicle computer 110 includes a processor and a memory such as are known. The memory includes one or more forms of computer-readable media, and stores instructions executable by the vehicle computer 110 for performing various operations, including as disclosed herein. The vehicle computer 110 can further include two or more computing devices operating in concert to carry out vehicle 105 operations including as described herein. Further, the vehicle computer 110 can be a generic computer with a processor and memory as described above and/or may include a dedicated electronic circuit including an ASIC that is manufactured for a particular operation, e.g., an ASIC for processing sensor 115 data and/or communicating the sensor 115 data. In another example, the vehicle computer 110 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in the vehicle computer 110.

The vehicle computer 110 may operate and/or monitor the vehicle 105 in an autonomous mode, a semi-autonomous mode, or a non-autonomous (or manual) mode, i.e., can control and/or monitor operation of the vehicle 105, including controlling and/or monitoring components 125. For purposes of this disclosure, an autonomous mode is defined as one in which each of vehicle 105 propulsion, braking, and steering are controlled by the vehicle computer 110; in a semi-autonomous mode the vehicle computer 110 controls one or two of vehicle 105 propulsion, braking, and steering; in a non-autonomous mode a human operator controls each of vehicle 105 propulsion, braking, and steering.

The vehicle computer 110 may include programming to operate one or more of vehicle 105 brakes, propulsion (e.g., control of acceleration in the vehicle 105 by controlling one or more of an internal combustion engine, electric motor, hybrid engine, etc.), steering, transmission, climate control, interior and/or exterior lights, horn, doors, etc., as well as to determine whether and when the vehicle computer 110, as opposed to a human operator, is to control such operations.

The vehicle computer 110 may include or be communicatively coupled to, e.g., via a vehicle communication network such as a communications bus as described further below, more than one processor, e.g., included in electronic controller units (ECUs) or the like included in the vehicle 105 for monitoring and/or controlling various vehicle components 125, e.g., a transmission controller, a brake controller, a steering controller, etc. The vehicle computer 110 is generally arranged for communications on a vehicle communication network that can include a bus in the vehicle 105 such as a controller area network (CAN) or the like, and/or other wired and/or wireless mechanisms.

Via the vehicle 105 network, the vehicle computer 110 may transmit messages to various devices in the vehicle 105 and/or receive messages (e.g., CAN messages) from the various devices, e.g., sensors 115, actuators 120, ECUs, etc. Alternatively, or additionally, in cases where the vehicle computer 110 actually comprises a plurality of devices, the vehicle communication network may be used for communications between devices represented as the vehicle computer 110 in this disclosure. Further, as mentioned below, various controllers and/or sensors 115 may provide data to the vehicle computer 110 via the vehicle communication network.

Vehicle 105 sensors 115 may include a variety of devices such as are known to provide data to the vehicle computer 110. For example, the sensors 115 may include Light Detection And Ranging (LIDAR) sensor 115(s), etc., disposed on a top of the vehicle 105, behind a vehicle 105 front windshield, around the vehicle 105, etc., that provide relative locations, sizes, and shapes of objects surrounding the vehicle 105. As another example, one or more radar sensors 115 fixed to vehicle 105 bumpers may provide data to provide locations of the objects, second vehicles, etc., relative to the location of the vehicle 105. The sensors 115 may further alternatively or additionally, for example, include camera sensor(s) 115, e.g., front view, side view, etc., providing images from an area surrounding the vehicle 105. As another example, the vehicle 105 can include one or more sensors 115, e.g., camera sensors 115, mounted inside a cabin of the vehicle 105 and oriented to capture images of users in the vehicle 105 cabin. In the context of this disclosure, an object is a physical, i.e., material, item that has mass and that can be represented by physical phenomena (e.g., light or other electromagnetic waves, or sound, etc.) detectable by sensors 115. Thus, the vehicle 105, as well as other items including as discussed below, fall within the definition of "object" herein.

The vehicle computer 110 is programmed to receive data from one or more sensors 115, e.g., substantially continuously, periodically, and/or when instructed by a remote computer 140, etc. The data may, for example, include a location of the vehicle 105. Location data specifies a point or points on a ground surface and may be in a known form, e.g., geo-coordinates such as latitude and longitude coordinates obtained via a navigation system, as is known, that uses the Global Positioning System (GPS) and/or dead reckoning. Additionally, or alternatively, the data can include a location of an object, e.g., a vehicle 105, a sign, a tree, etc., relative to the vehicle 105. As one example, the data may be image data of the environment around the vehicle 105. In such an example, the image data may include one or more objects and/or markings, e.g., lane markings, on or along a road. As another example, the data may be image data of the vehicle 105 cabin, e.g., including users and seats in the vehicle 105 cabin. Image data herein means digital image data, i.e., comprising pixels, typically with intensity and color values, that can be acquired by camera sensors 115. The sensors 115 can be mounted to any suitable location in or on the vehicle 105, e.g., on a vehicle 105 bumper, on a vehicle 105 roof, etc., to collect images of the environment around the vehicle 105.

The vehicle 105 actuators 120 are implemented via circuits, chips, or other electronic and or mechanical components that can actuate various vehicle 105 subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation-such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a suspension component (e.g., that may include one or more of a damper, e.g., a shock or a strut, a bushing, a spring, a control arm, a ball joint, a linkage, etc.), a brake component, a park assist component, an adaptive cruise control component, an adaptive steering component, one or more passive restraint systems (e.g., airbags), a movable seat, etc.

The vehicle 105 further includes a human-machine interface (HMI) 118. The HMI 118 includes user input devices such as knobs, buttons, switches, pedals, levers, touchscreens, and/or microphones, etc. The input devices may include sensors 115 to detect a user input and provide user input data to the vehicle computer 110. That is, the vehicle computer 110 may be programmed to receive user input from the HMI 118. The user may provide the user input via the HMI 118, e.g., by selecting a virtual button on a touchscreen display, by providing voice commands, etc. For example, a touchscreen display included in an HMI 118 may include sensors 115 to detect that a user selected a virtual button on the touchscreen display to, e.g., select or deselect an operation, which input can be received in the vehicle computer 110 and used to determine the selection of the user input.

The HMI 118 typically further includes output devices such as displays (including touchscreen displays), speakers, and/or lights, etc., that output signals or data to the user. The HMI 118 is coupled to the vehicle communication network and can send and/or receive messages to/from the vehicle computer 110 and other vehicle sub-systems.

In addition, the vehicle computer 110 may be configured for communicating via a vehicle-to-vehicle communication module or interface with devices outside of the vehicle 105, e.g., through a vehicle-to-vehicle (V2V) or vehicle-to-infrastructure (V2X) wireless communications (cellular and/or DSRC., etc.) to another vehicle, and/or to a remote computer 140 (typically via direct radio frequency communications). The communication module could include one or more mechanisms, such as a transceiver, by which the computers of vehicles may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications module include cellular, Bluetooth, IEEE 802.11, Ultra-Wideband (UWB), Near Field Communication (NFC), dedicated short range communications (DSRC), and/or wide area networks (WAN), including the Internet, providing data communication services.

The network 135 represents one or more mechanisms by which a vehicle computer 110 may communicate with remote computing devices, e.g., the remote computer 140, another vehicle computer, etc. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks 135 include wireless communication networks (e.g., using Bluetooth®, Bluetooth® Low Energy (BLE), UWB, NFC, IEEE 802.11, vehicle-to-vehicle (V2V) such as Dedicated Short Range Communications (DSRC), etc.), local area networks (LAN) and/or wide area networks (WAN), including the Internet, providing data communication services.

Figure 1B:
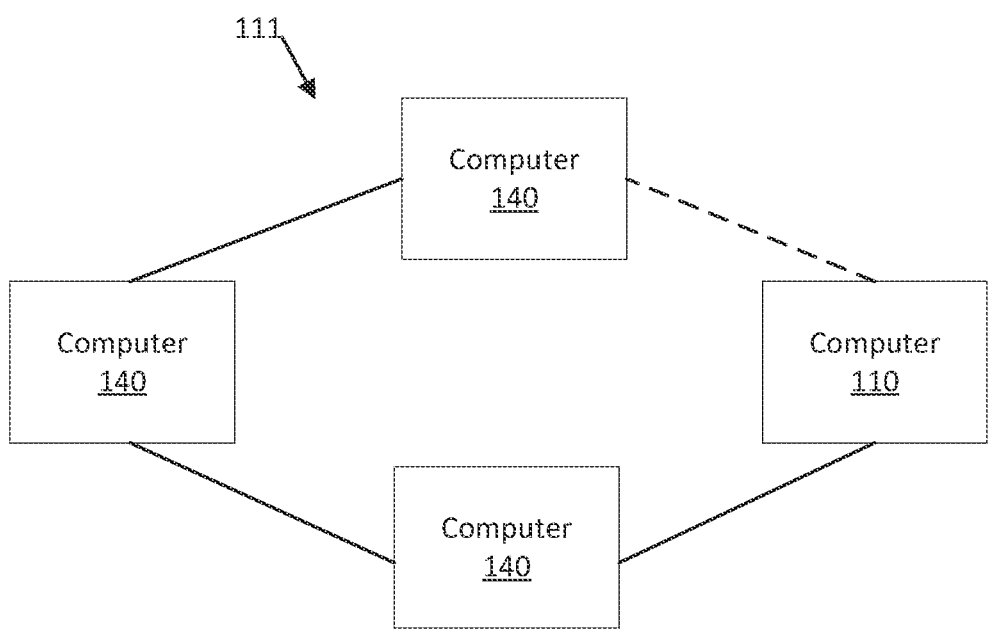
FIG. 1B is a block diagram illustrating an example authorization network.

The vehicle computer 110 may be communicatively coupled to a plurality of remote computers 140 in an authorization network 111 (see FIG. 1B). In the present context, "remote computer" means that the computer is not installed on the vehicle 105. That is, the vehicle can move separately from the remote computer 140.

In this document, the term "network" in the context of an authorization network 111 means a network formed by computers 110, 140, i.e., an authorization network 111 means the computers 110, 140 that are authorized to perform biometric authorization for the user and include links to each other computers 110, 140. On the other hand, a "network" in the context of devices communicating with each other, e.g., ECUs and/or devices communicating via a vehicle network and/or wide area network 135, means a physical wired and/or wireless network comprising conventional networking hardware, media, protocols, etc.

The authorization network 111 includes distributed computers 110, 140 as a peer-to-peer network that could also include a supervisory computer. That is, the authorization network 111 includes the plurality of computers 110, 140 with each computer 110, 140 in the peer-to-peer network including links to other computers 110, 140 in the authorization network 111. Computers 110, 140 in the authorization network 111 may be specified by, e.g., the vehicle 105 owner, the vehicle 105 manufacturer, etc.

A remote computer 140 can be a conventional computing device, i.e., including one or more processors and one or more memories, programmed to provide operations such as disclosed herein. Further, the remote computer 140 can be accessed via the network 135, e.g., the Internet, a cellular network, and/or some other wide area network. The remote computers 140 are maintained by respective entities other than the vehicle 105, e.g., a vehicle 105 owner, a vehicle 105 manufacturer, one or more authorized users of the vehicle 105, etc.

A remote computer 140 may include an HMI. The HMI of the remote computer 140 has features in common with the HMI 118 of the vehicle computer 110, e.g., input devices and output devices, and therefore will not be described further to avoid redundancy.

As one example, a remote computer 140 can be a portable device 140. A portable device can be any one of a variety of computers that can be used while carried by a person, e.g., a smartphone, a tablet, a personal digital assistant, a smart watch, a key fob, etc. As another example, a remote computer 140 may be maintained at a location of an entity associated with the remote computer 140.

Figure 2:
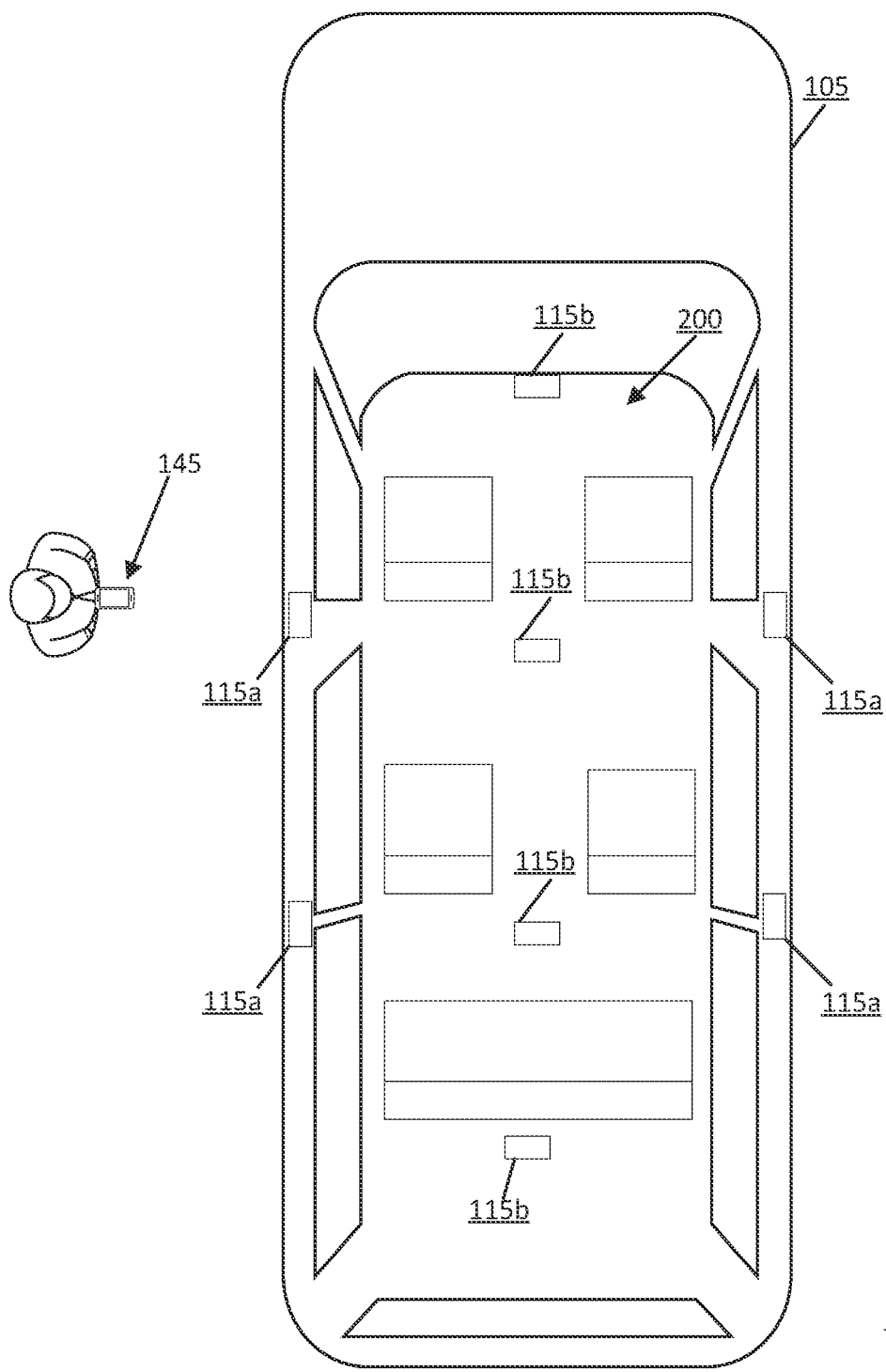
FIG. 2 is a diagram illustrating an exemplary passenger cabin of a vehicle.

FIG. 2 is a diagram of a top view of an example passenger cabin 200 of an example vehicle 105. The vehicle 105 may include a body (not numbered) defining the passenger cabin 200 to house occupants, if any, of the vehicle. The body includes doors and windows that can be opened, e.g., to allow ingress and egress from the passenger cabin 200.

The passenger cabin 200 may extend across the vehicle 105, i.e., from one side to the other side of the vehicle 105. The passenger cabin 200 includes a front end (not numbered) and a rear end (not numbered) with the front end being in front of the rear end during forward movement of the vehicle 105. The passenger cabin 200 includes one or more seats (not numbered). The seats may be arranged in any suitable arrangement. For example, the passenger cabin 200 may include one or more front seats disposed at a front of the passenger cabin 200 and one or more back seats disposed behind the front seats. The passenger cabin 200 may also include third-row seats at the rear of the passenger cabin 200. In FIG. 2, the front seats and back seats are shown to be bucket seats and the third-row seats are shown to be bench seats, but the seats may be other types.

The vehicle 105 may include any suitable number of sensors 115, e.g., one or more. For example, as illustrated in FIG. 2, the vehicle 105 may include a plurality of external sensors 115a that are positioned to monitor an environment around the vehicle 105, and a plurality of internal sensors 115b that are positioned to monitor the passenger cabin 200 of the vehicle 105.

The vehicle computer 110 may be programmed to authenticate a user. Authenticating the user means validating or proving the identity of the user; a failure to authenticate occurs upon a determination that the user's identity cannot be validated, i.e., proved. If the vehicle computer 110 determines to authenticate the user, then the vehicle computer 110 can allow the user to initiate biometric enrollment, e.g., by providing virtual buttons or the like on the HMI 118 to initiate biometric enrollment (as discussed below). If the vehicle computer 110 determines to not authenticate the user, then the vehicle computer 110 can prevent the user from initiating biometric enrollment, e.g., by disabling (or removing) the virtual buttons on the HMI 118 to initiate biometric enrollment.

The vehicle computer 110 can authenticate the user based on receiving a first user input specifying identifying information for the user, e.g., a username and a password. In such an example, the vehicle computer 110 can actuate the HMI 118 to display virtual buttons corresponding to alphanumeric characters that the user can select to provide the identifying information. In other words, the HMI 118 may activate sensors that can detect the user selecting virtual buttons to specify the user's identifying information. Upon detecting the first user input, the HMI 118 can provide the first user input to the vehicle computer 110, and the vehicle computer 110 can authenticate the user based on the first user input. For example, the vehicle computer 110 can compare the identifying information specified by the first user input to identifying information stored, e.g., in a memory of the vehicle computer 110. If the retrieved identifying information matches the stored identifying information, then the vehicle computer 110 determines to authenticate the user. In this context, "match" means retrieved identifying information identifies a same user as stored identifying information. If the retrieved identifying information does not match the stored identifying information, then the vehicle computer 110 determines to not authenticate the user.

As another example, the vehicle computer 110 can authenticate the user based on detecting an authorized portable device 140 within a predetermined distance of the vehicle 105. For example, the vehicle computer 110 can detect a portable device 140 based on detecting the return of an RF signal, as discussed above. Additionally, the vehicle computer 110 can receive location data from the portable device 140, as discussed above. Upon detecting the portable device 140, the vehicle computer 110 can compare a distance between the portable device 140 and the vehicle computer 110 to the predetermined distance. The distance is a straight line distance between geo-coordinates specified by the location data of the portable device 140 and geo-coordinates specified by the geo-fence for the passenger cabin 200. The predetermined distance specifies a maximum distance from a vehicle 105 within which the vehicle computer 110 can identify a user. The predetermined distance may be determined empirically, e.g., based on testing that allows for determining a distance from the vehicle 105 that indicates the detected user is likely to seek access to the vehicle 105. The predetermined distance may be stored, e.g., in a memory of the vehicle computer 110.

If the distance is greater than the predetermined distance, then the vehicle computer 110 can ignore the detected portable device 140. In this situation, the vehicle computer 110 determines to not authenticate the user. If the distance is less than or equal to the predetermined distance, then the vehicle computer 110 can authorize the portable device 140. Upon authorizing the portable device 140, the vehicle computer 110 can be programmed to authenticate the user.

Authorizing the portable device 140 means the vehicle computer 110 determining that the portable device 140 has permission to communicate with the vehicle computer 110; a failure to authorize occurs upon a determination that the portable device 140 lacks permission to communicate with the vehicle computer 110. The vehicle computer 110 may, for example, be programmed to authorize the portable device 140 based on a key, e.g., a combination of numbers and/or characters, received from the portable device 140. For example, the vehicle computer 110 may authorize the portable device 140 based on determining the received key matches an expected key, e.g., known to certain parties such as vehicle 105 distributors, e.g., dealers, stored in the memory of the vehicle computer 110. As another example, the authorized portable device 140 can have an RFID device or the like uniquely specifying the user from among other potential users who regularly use the vehicle 105. The RFID signal can be associated with the user in memory of the vehicle computer 110. As another example, the authorized portable device 140 can pair with, e.g., the HMI 118. The authorized portable device 140 can be associated with the user in memory.

Upon authenticating the user, the vehicle computer 110 may be programmed to initiate biometric enrollment for the user based on receiving a second user input. For example, the vehicle computer 110 can actuate the HMI 118 to display virtual buttons or the like that the user can select to initiate biometric enrollment. In other words, the HMI 118 may activate sensors that can detect the user selecting the virtual button to initiate biometric enrollment. Upon detecting the second user input, the HMI 118 can provide the second user input to the vehicle computer 110, and the vehicle computer 110 can initiate biometric enrollment based on the second user input.

Biometric enrollment in this document means generating user data based on obtaining enrollment, i.e., baseline, biometric data for a given user. During biometric enrollment, the vehicle computer 110 generates user data for the user. For example, the vehicle computer 110 can maintain a look-up table or the like, e.g., stored in the memory of the vehicle computer 110, that associates the user with the corresponding biometric data. Upon determining to initiate biometric enrollment, the vehicle computer 110 can update the look-up table to associate the user with the initial enrollment biometric data. The vehicle computer 110 can control vehicle 105 operation based on the user data for the user.

The vehicle computer 110 can store, e.g., in a memory, user data for each of a plurality of potential users. Additionally, or alternatively, the vehicle computer 110 can provide user data to the remote computers 140 on the authorization network 111, e.g., by transmitting the user data via the network 135 to the remote computers 140. The user data can keep track of authorized users, i.e., users that have permission to access the vehicle 105, and the user data can update over time as biometric data for the user changes, e.g., due to weight gain or loss, age, hair growth or loss, etc. User data includes biometric data for the respective user and a user authorization for the respective user. A user authorization, as used herein, specifies one or more vehicle 105 features that a user has permission to access and/or one or more operating parameters that a user has permission to control.

In the context of this document a "vehicle feature" is a setting of a vehicle component 125 that can be selected by user input, e.g., via the HMI 118. Non-limiting examples of vehicle 105 features include heating and/or cooling seats, climate control, e.g., in multiple zones or areas of the passenger cabin 200, heating a steering wheel, auto-dimming a rearview mirror, heating side mirrors, multi-color lighting, controlling a radio, controlling a moonroof, etc.

In the context of this document an "operating parameter" is an actual value of a measurement of a physical characteristic of a vehicle 105 or an environment around that vehicle 105 during vehicle operation. A variety of operating parameters may be determined during vehicle 105 operation. A non-limiting list of operating parameters includes a speed of the vehicle 105, a following distance between vehicles, a stopping location, an acceleration rate of the vehicle 105, a vehicle 105 destination, a vehicle 105 route, etc.

The vehicle computer 110 can actuate one or more external sensor(s) 115a to obtain the enrollment biometric data for the user. For example, the vehicle computer 110 can actuate sensor(s) 115 positioned to face the user, e.g., when the user is inside and/or outside of the passenger cabin 200. The vehicle computer 110 can actuate various sensors 115 to obtain corresponding types of biometric data. For example, the vehicle computer 110 can actuate an image sensor 115 to obtain image data including facial characteristics of the user. Additionally, or alternatively, the vehicle computer 110 can actuate a capacitive touch sensor 115 to obtain data including a fingerprint of the user. The vehicle computer 110 can, for example, validate biometric data by employing known watermarking techniques that encrypt data strings that indicate validity of the biometric data and include the encrypted data strings in the biometric data.

The vehicle computer 110 is programmed to biometrically authorize the user based on challenge biometric data for the user and the user data. Challenge biometric data herein means biometric data obtained from a user in real-time or near real-time to compare to enrollment biometric data to perform biometric authorization for the user. Challenge biometric data is obtained after generation of the user data for the user based on the enrollment biometric data. Challenge biometric data is obtained while the user is outside the vehicle 105 (see FIG. 2).

The vehicle computer 110 is programmed to obtain the challenge biometric data based on detecting a user approaching the vehicle 105. The vehicle computer 110 can receive sensor 115 data, e.g., image data, LIDAR data, radar data, etc., of the environment around the vehicle 105. That is, the vehicle computer 110 can receive data from a sensor 115 positioned to face the environment, e.g., an external sensor 115a. The sensor 115 data can include one or more objects 205 around the vehicle 105. The vehicle computer 110 can monitor data from the external sensor 115a to detect an object 205 has moved into a field of view of the external sensor 115a. The vehicle computer 110 can identify the detected object 205 based on the sensor 115 data. For example, object identification techniques can be used, e.g., in the vehicle computer 110 based on LIDAR sensor 115 data, camera sensor 115 data, etc., to identify a type of object 205, e.g., a user, an animal, a vehicle, etc., as well as physical features of objects 205.

Any suitable techniques may be used to interpret sensor 115 data. For example, camera and/or LIDAR image data can be provided to a classifier that comprises programming to utilize one or more conventional image classification techniques. For example, the classifier can use a machine learning technique in which data known to represent various objects, is provided to a machine learning program for training the classifier. Once trained, the classifier can accept as input vehicle sensor 115 data, e.g., an image, and then provide as output, for each of one or more respective regions of interest in the image, an identification of a user or an indication that no user is present in the respective region of interest. Further, a coordinate system (e.g., polar or cartesian) applied to an area proximate to the vehicle 105 can be applied to specify locations and/or areas (e.g., according to the vehicle 105 coordinate system, translated to global latitude and longitude geo-coordinates, etc.) of a user identified from sensor 115 data. Yet further, the vehicle computer 110 could employ various techniques for fusing (i.e., incorporating into a common coordinate system or frame of reference) data from different sensors 115 and/or types of sensors 115, e.g., LIDAR, radar, and/or optical camera data.

Upon identifying the type of object 205 as a type other than a user, the vehicle computer 110 can ignore the object 205. Upon identifying the type of object 205 as a user, the vehicle computer 110 can determine a distance from the user to the vehicle 105 based on data from an external sensor 115a. For example, the external sensor 115a can measure an amount of time elapsed from emitting a radio wave (or a light wave) to receiving the radio wave (or light wave) reflected from the user. Based on the time elapsed and a speed of light, the vehicle computer 110 can determine the distance between the vehicle 105 and the user.

The vehicle computer 110 can be programmed to initiate biometric authorization of the user based on the user being within the predetermined distance of the vehicle 105. If the distance is greater than the predetermined distance, then the vehicle computer 110 can ignore the user. If the distance is less than or equal to the predetermined distance, then the vehicle computer 110 obtains the challenge biometric data for the user. For example, the vehicle computer 110 can actuate sensor(s) 115 positioned to face the user outside the vehicle 105, i.e., external sensors 115a. The vehicle computer 110 can actuate various sensors 115 to obtain corresponding types of biometric data, as discussed above.

Upon obtaining the challenge biometric data for the user, the vehicle computer 110 performs biometric authorization using the challenge biometric data for the user and the user data. Authorizing the user means determining that the user has permission to access the vehicle 105; a failure to authorize occurs upon a determination that the user lacks permission to access the vehicle 105.

Biometric facial recognition is described herein as one non-limiting example of biometric authorization. Biometric facial recognition typically operates by calculating physiological characteristics of a human face and comparing the calculated physiological characteristics to stored physiological characteristics from the trained model. Physiological characteristics can include measures of facial features such as the distance between pupils, distance between corners of the mouth and length of nose, etc. These measures can be normalized by forming ratios of the measurements and stored as the trained model. At challenge time, an image of the human seeking access is acquired and processed to extract physiological characteristics which are then compared to stored physiological characteristics to determine a match. Other non-limiting examples of biometric authorization can include fingerprint recognition, eye recognition, voice recognition, etc.

Biometric authorization software can be executed on the vehicle computer 110 or the sensor 115 data, e.g., image data, can be uploaded to a remote computer 140 that maintains a database of trained models for execution. An example of biometric authorization software is facial identification software, for example Face Tracker. Face Tracker is a facial recognition software library written in C++ and available on facetracker.net under the MIT software license.

Facial identification software can determine two sets of facial features corresponding to a challenge image and an enrollment image and determine ratios of distances between features. Facial identification software can determine a confidence score by determining a match value with previously determined facial identification features. A user status can be determined by comparing the confidence score to the first and second confidence thresholds, as discussed below.

Facial features include locations on a facial image such as inner and outer corners of the eyes and corners of the mouth. For example, facial feature detection routines such as SURF in the Dlib image processing library can determine locations on a face corresponding to facial features such as the center of each eye and the center of a mouth. The facial identification software can compare the ratios based on the two sets of features and determine a match value. If the ratios between sets of features match, meaning that they have the same value within an empirically determined tolerance, the person in the challenge image is determined to be the same person as in the previously acquired enrollment image.

The match value can be determined by determining a mean squared difference between the two sets of ratios. Matching the ratios of distances can reduce the variance in facial feature measurements caused by differences due to differences in distances from the camera and differences in poses between the two images.

The confidence score can be determined by multiplying the match value by a scalar constant that maps the match value to the interval (0,1), with values close to 1 corresponding to a good match and values close to 0 corresponding to a poor match. The scalar constant can be determined empirically by acquiring and testing a plurality of enrollment and challenge images.

Upon determining the confidence score for the challenge biometric data, the vehicle computer 110 can determine a user status for the user based on the confidence score. The user status is one of "authorized" or "not authorized," as set forth above. To determine the user status, the vehicle computer 110 compares the confidence score for the challenge biometric data to the first confidence threshold and the second confidence threshold. The second confidence threshold is less than the first confidence threshold, as set forth above.

A confidence score greater than or equal to the first confidence threshold can indicate that the challenge biometric data is a good match for the enrollment biometric data. That is, if the confidence score is greater than or equal to the first confidence threshold, then the vehicle computer 110 can determine that the user status is "authorized." A confidence score less than or equal to the second confidence threshold can indicate that the challenge biometric data did not match the enrollment biometric data. That is, if the confidence score is less than or equal to the second confidence threshold, then the vehicle computer 110 can determine that the user status is "not authorized."

The first confidence threshold can, for example, be determined empirically, e.g., based on testing that allows for determining a threshold that minimizes a number of incorrectly authorized users. The second confidence threshold can be determined empirically, e.g., based on testing that allows for determining a threshold that minimizes a number of incorrectly not authorized users. The first and second confidence thresholds can be stored, e.g., in a memory of the vehicle computer 110.

As another example, the first and/or second confidence threshold can be determined based on a third user input. For example, the vehicle computer 110 can actuate the HMI 118 to display virtual buttons that the user can select to specify the first and/or second confidence threshold. In other words, the HMI 118 may activate sensors that can detect the user selecting the virtual button to specify the first and/or second confidence threshold. Upon detecting the third user input, the HMI 118 can provide the third user input to the vehicle computer 110, and the vehicle computer 110 can determine the first and/or second confidence threshold based on the third user input.

Additionally, or alternatively, the first and/or second confidence threshold can be determined based on a location of the vehicle 105. For example, the vehicle computer 110 can maintain a look-up table, or the like, that associates various locations with corresponding first and/or second confidence thresholds. The look-up table may be stored, e.g., in a memory of the vehicle computer 110. The vehicle computer 110 can determine the first and/or second confidence thresholds using the look-up table by selecting the first and/or second confidence thresholds associated with a stored location that matches, i.e., is at or within a specified distance of (e.g., based on location data resolution limitations), a location of the vehicle 105. For example, the vehicle computer 110 may receive a location of the vehicle 105, e.g., from a sensor 115, a navigation system, a remote computer 140, etc. The vehicle computer 110 can determine the first and/or second confidence thresholds for various locations based on receiving a fourth user input, e.g., via the HMI 118, specifying first and/or second confidence thresholds for various locations.

Additionally, or alternatively, the first and/or second confidence threshold can be determined based on a time of day. For example, the look-up table may associate various first and/or second confidence thresholds with corresponding times of day. For example, the vehicle computer 110 can receive a sunset time for a current day and a sunrise time for a next day, e.g., from a remote computer 140 via the network 135. The vehicle computer 110 may maintain a clock and can compare a current time to the received sunset and sunrise times. If the current time is after the sunset time and before the sunrise time, then the vehicle computer 110 can select the first and/or second confidence thresholds associated with nighttime in the look-up table. If the current time is before the sunset time or after the sunrise time, then the vehicle computer 110 can select the first and/or second confidence thresholds associated with daytime in the look-up table. As another example, the vehicle computer 110 select the first and/or second confidence thresholds associated with a predetermined time, e.g., specified by an owner of the vehicle 105. The predetermined time may be stored, e.g., in a memory of the vehicle computer 110. The vehicle computer 110 can determine the first and/or second confidence thresholds for various times of day based on receiving a fifth user input, e.g., via the HMI 118, specifying first and/or second confidence thresholds for the various times of day.

Additionally, or alternatively, the first and/or second confidence threshold can be determined based on environmental conditions around the vehicle 105. Environmental conditions in the context of this document are physical phenomena in an environment that can be measured and/or determined by the vehicle 105. That is, environmental conditions are actual physical characteristics around the vehicle 105. For example, the look-up table may associate various first and/or second confidence thresholds with corresponding environmental conditions, e.g., a presence of precipitation, an absence of precipitation, etc. The vehicle computer 110 can identify an environmental condition based on weather data. For example, the weather data can specify physical characteristics associated with the environmental condition. The weather data typically includes conventional measurements, e.g., ambient air temperature, ambient humidity, precipitation data, forecasts, wind speed, etc. The vehicle computer 110 can, for example, receive weather data from an external server, e.g., from a weather station, the remote server computer 140, etc. The vehicle computer 110 can select the first and/or second confidence thresholds associated with the identified environmental condition in the look-up table. The vehicle computer 110 can determine the first and/or second confidence thresholds for various environmental conditions based on receiving a seventh user input, e.g., via the HMI 118, specifying first and/or second confidence thresholds for the various environmental conditions.

Upon determining that the user status is "authorized," the vehicle computer 110 can control the vehicle 105 based on the user data for the user, e.g., the user authorization. For example, the vehicle computer 110 can control vehicle 105 locks to permit the user to access areas of the vehicle 105, e.g., a driver seat, a passenger seat, a rear seat, etc., specified by the user authorization Additionally, the vehicle computer 110 can actuate one or more vehicle components 125 to operate the vehicle 105 to satisfy the operating parameters specified by the user authorization. As another example, the vehicle computer 110 can actuate one or more vehicle components 125 to adjust one or more vehicle 105 features specified by the user authorization.

Upon determining that the user status is "not authorized," the vehicle computer 110 can control vehicle 105 locks to prevent the user from accessing the vehicle 105, e.g., the passenger cabin 200. Additionally, or alternatively, the vehicle computer 110 can prevent actuation of one or more vehicle components 125, e.g., so as to prevent operation of the vehicle 105 and/or adjustment of one or more vehicle 105 features.

A confidence score less than the first confidence threshold and greater than the second confidence threshold can indicate problems with the challenge biometric data, e.g., an unauthorized user passed facial identification, or an authorized user failed facial identification. If the confidence score is between the first and second confidence thresholds, then the vehicle computer 110 determines the user status based on a confirmation confidence score for the challenge biometric data.

Figure 3A:
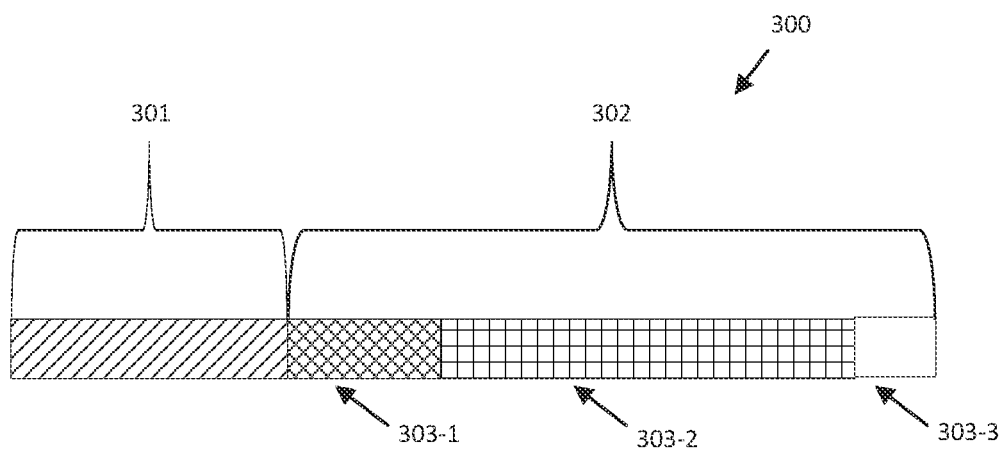
FIG. 3A is a block diagram illustrating an example request message.
Figure 3B:
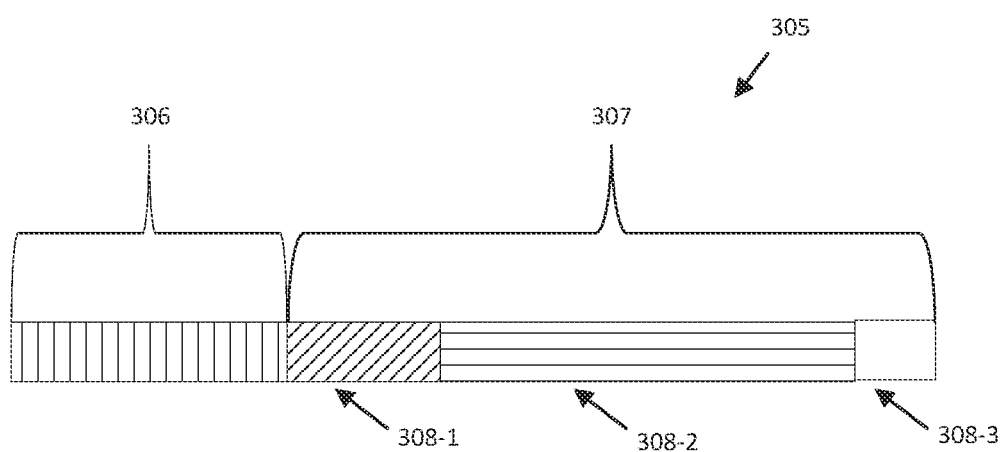
FIG. 3B is a block diagram illustrating an example reply message.
Figure 3C:
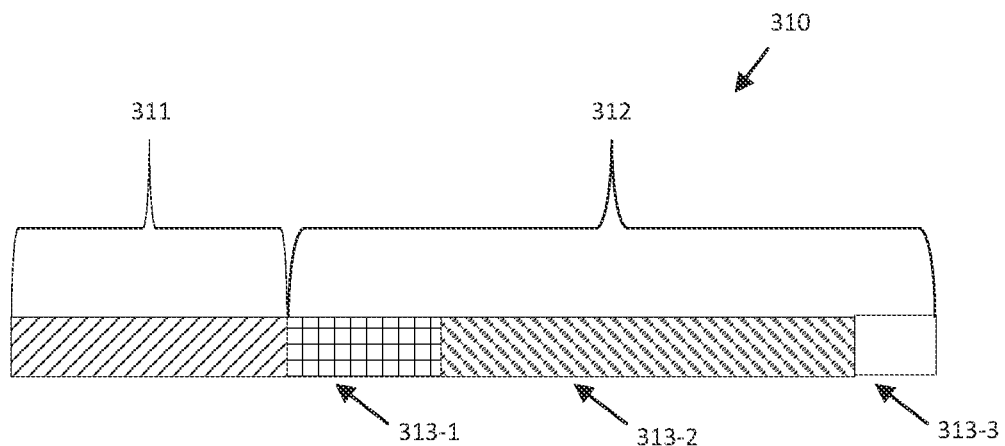
FIG. 3C is a block diagram illustrating an example authorization message.
Figure 3D:
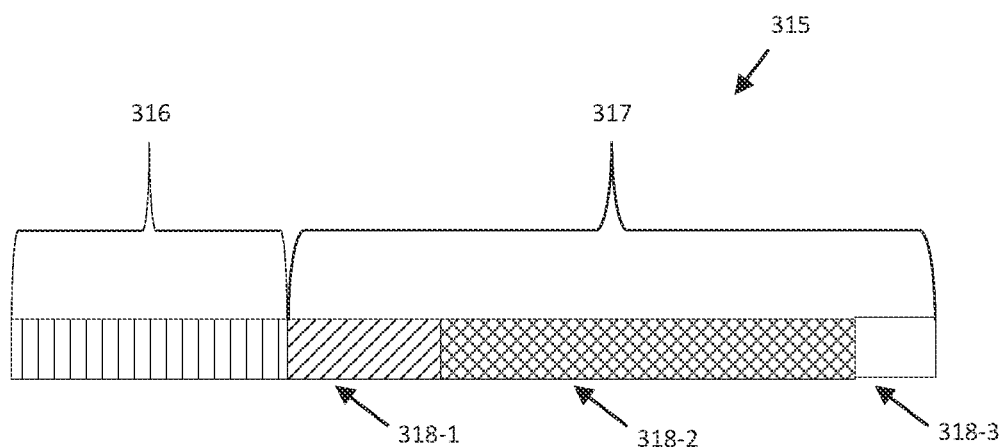
FIG. 3D is a block diagram illustrating an example response message.
Figure 4:
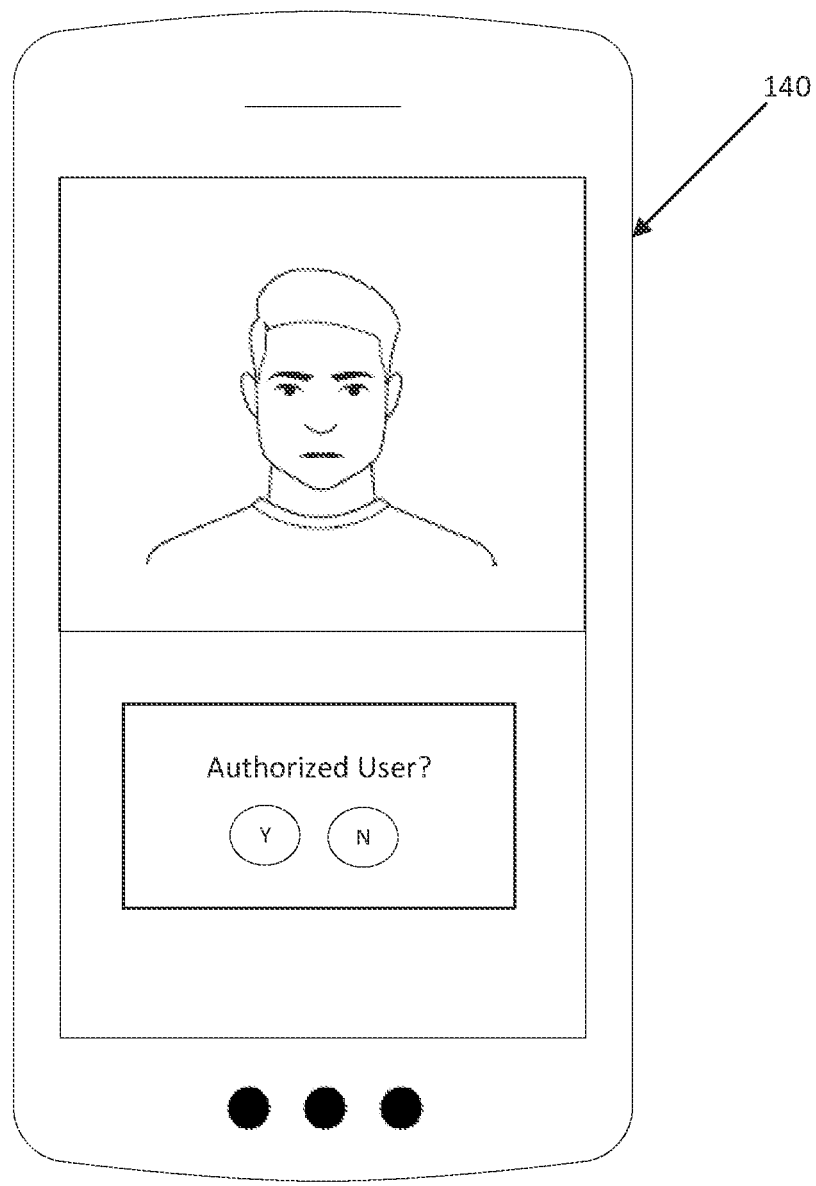
FIG. 4 is a diagram illustrating an example authorized portable device requesting a user input specifying a user status.

To determine the confirmation confidence score, the vehicle computer 110 can send a request to the remote computers 140. For example, the vehicle computer 110 can generate a request message 300. A request message includes a header 301 and a payload 302 (see FIG. 3A). The header 301 of the request message 300 may include a message type, a message size, etc. The payload 302 may include various data, i.e., message content. The payload 302 can include sub-payloads or payload segments 303-1, 303-2, 303-3 (collectively, referred to as payload segments 303). The respective payload segments 303 in FIG. 3A are illustrated as being of different lengths to reflect that different payload segments 303 may include various amounts of data, and therefore may be of different sizes, i.e., lengths. The payload 302 of the request message 300 includes, e.g., in a specified payload segment 303, the request to provide a respective remote confidence score for the challenge biometric data. The payload 302 of the request message 300 may include, e.g., in another specified payload segment 303, the challenge biometric data for the user. Alternatively, the vehicle computer 110 can provide the challenge biometric data for the user in a different transmission.

Upon generating the request message 300, the vehicle computer 110 can provide the request message 300 to each of the remote computers 140 in the authorization network 111. For example, the vehicle computer 110 can transmit the request message 300, e.g., via the network 135, to each of the remote computers 140. The remote computers 140 can provide respective reply messages 305 in response to the request message 300, as discussed below.

The vehicle computer 110 can receive a reply message 305 from the remote computers 140. For example, the vehicle computer 110 can receive respective reply messages 305 from each of the remote computers 140. As another example, the vehicle computer 110 can receive respective reply messages 305 from a subset, i.e., some but not all, of the remote computers 140. The vehicle computer 110 can, for example, monitor the network 135 to detect the reply messages 305 for a predetermined amount of time after providing the request message 300 (e.g., specified by a vehicle and/or component manufacturer based on expected communication latency between the vehicle computer 110 and remote computers 140).

Upon receiving the reply messages 305, the vehicle computer can access a payload 307, e.g., a specified payload segment 308, of each reply message 305 and retrieve the corresponding remote confidence score for the challenge biometric data. The vehicle computer 110 then determines the confirmation score based on the received remote confidence scores. For example, the vehicle computer 110 can determine the confirmation confidence score (or simply confirmation score) according to Equation 1:

$$F = \sum_{i=1}^{N} \left( \frac{n * w_i * x_i}{N} \right) \quad (1)$$

where F is the confirmation confidence score, n is a number of received remote confidence scores, N is a total number of remote computers 140 in the authorization network 111, w is a weight for a given remote computer 140, x is a remote confidence score (as discussed below) provided by a given remote computer 140, and the subscript "i" denotes a remote computer 140 included in the authorization network 111.

Each remote computer 140 may be allotted a predetermined weight (for example, stored in memory by the device manufacturer, or for aftermarket devices, stored in memory when the aftermarket device is added to the authorization network 111). The weight may be predetermined, for example, based on the entity associated with the remote computer 140. In such an example, a remote computer 140 associated with an owner of the vehicle 105 may have a higher predetermined weight than a remote computer 140 associated with another entity.

Upon determining the confirmation confidence score, the vehicle computer 110 can compare the confirmation confidence score to the first and second confidence thresholds. If the confirmation confidence score is greater than or equal to the first threshold, then the vehicle computer 110 determines that the user status is "authorized." In this situation, the vehicle computer 110 can control the vehicle 105 based on the user data for the user, as discussed above.

If the confirmation confidence score is between the first and second confidence thresholds, then the vehicle computer 110 determines the user status based on the authenticator. An authenticator herein means a device or information that identifies an authorized user. For example, the vehicle computer 110 can determine that the user status is "authorized" based on detecting the authenticator. Conversely, the vehicle computer 110 can determine that the user status is "not authorized" based on detecting an absence of the authenticator.

Prior to detecting a presence or an absence of the authenticator, the vehicle computer 110 can control the vehicle 105 based on a predetermined user authorization. The predetermined authorization may be stored, e.g., in the memory of the vehicle computer 110. The predetermined authorization may be specified by a vehicle 105 and/or component 125 manufacturer to permit limited access to (i.e., access to some but not all features of) the vehicle 105, e.g., control vehicle locks to allow a user to enter the passenger cabin 200 but prevent the user from operating the vehicle 105 and/or adjusting vehicle 105 features.

The vehicle computer 110 can then detect the user is inside the passenger cabin 200 based on data from the internal sensor 115*b*. For example, the vehicle computer 110 can monitor data from the internal sensor 115*b* to detect a user has moved into the field of view of the internal sensor 115*b*. Upon detecting the user inside the passenger cabin 200, the vehicle computer 110 can detect the authenticator. The authenticator may be the first user input specifying identifying information for the user, as discussed above. For example, the vehicle computer 110 can detect the authenticator based on receiving the first user input specifying identifying information that matches stored identifying information, as discussed above. Conversely, the vehicle computer 110 can detect an absence of the authenticator based on failing to receive a user input or receiving a user input specifying identifying information that does not match stored identifying information, as discussed above.

As another example, the authenticator may be the authorized portable device 140. For example, the vehicle computer 110 can detect the authenticator based on detecting the authorized portable device 140 within the predetermined distance, as discussed above. Conversely, the vehicle computer 110 can detect an absence of the authenticator based on detecting an absence of the authorized portable device 140 within the predetermined distance, as discussed above.

As another example, the authenticator can be secondary biometric data. Secondary biometric data herein means biometric data that is obtained subsequent to the challenge biometric data and via a different sensor. For example, the vehicle computer 110 may actuate the HMI 118 to provide, e.g., via a display, speakers, etc., instructions for the user to provide the secondary biometric data. Secondary biometric data is a same type of data as the challenge biometric data. For example, the vehicle computer 110 can actuate one or more sensor(s) 115 positioned to face the user inside the passenger cabin 200, i.e., internal sensors 115*b*, to obtain the secondary biometric data. The vehicle computer 110 can then biometrically authorize the user based on the secondary biometric data. The vehicle computer 110 can determine a confidence score for the secondary biometric data, e.g., in substantially the same manner as discussed above regarding determining a confidence score for the challenge biometric data, and can compare the confidence score for the secondary biometric data to the first confidence threshold. If the confidence score for the secondary biometric data is greater than or equal to the first confidence threshold, then the vehicle computer 110 can detect the authenticator. If the confidence score for the secondary biometric data is less than the first confidence threshold, then the vehicle computer 110 can detect an absence of the authenticator.

Upon detecting the authenticator, the vehicle computer 110 can control the vehicle 105 based on the user data for the user, as discussed above. Upon detecting an absence of the authenticator, the vehicle computer 110 can control vehicle components 125 to prevent operation of the vehicle 105. Additionally, the vehicle computer 110 can control vehicle components 125, e.g., disabling virtual buttons on the HMI 118, to prevent the user from accessing and/or updating user data stored in the memory of the vehicle computer 110. In such an example, the vehicle computer 110 can provide a message to one or more remote computers 140 specifying that an unauthorized user is attempting to access the vehicle 105.

If the confirmation confidence score is less than or equal to the second threshold, then the vehicle computer 110 determines that the user status based on supplemental biometric data for the user. Supplemental biometric data herein means a different type of biometric data than the challenge biometric data. Supplemental biometric data may be obtained after the challenge biometric data being obtained. For example, the vehicle computer 110 may actuate the HMI 118 to provide, e.g., via a display, speakers, etc., instructions for the user to provide the supplemental biometric data. As one non-limiting example, the challenge biometric data may include facial characteristics of the user, and the supplemental biometric data may include a fingerprint of the user, iris characteristics, voice characteristics, etc.

The vehicle computer 110 may be programmed to biometrically authorize the user based on the supplemental biometric data and the user data. For example, the user data may include supplemental enrollment biometric data that is a same type of biometric data as the supplemental biometric data. The vehicle computer 110 can actuate sensor(s) 115 positioned to face the user outside the passenger cabin 200, i.e., external sensors 115*a*, to obtain the supplemental biometric data. The vehicle computer 110 can determine a confidence score for the supplemental biometric data, e.g., in substantially the same manner as discussed above regarding determining a confidence score for the challenge biometric data, and can compare the confidence score for the supplemental biometric data to a third confidence threshold. The third confidence threshold is greater than the first confidence threshold. The third threshold may, for example, be a predetermined percentage of the first threshold, e.g., 125%, to minimize a likelihood of an unauthorized user being authentication. If the confidence score for the supplemental biometric data is greater than or equal to the third confidence threshold, then the vehicle computer 110 can determine that the user status is "authorized." If the confidence score for the supplemental biometric data is less than the third confidence threshold, then the vehicle computer 110 can determine that the user status is "not authorized."

Upon determining that the user status is "authorized" via the supplemental biometric data, the vehicle computer 110 can control the vehicle 105 based on the user data for the user, as discussed above. Upon determining that the user status is "not authorized" via the supplemental biometric data, the vehicle computer 110 can prevent the user from accessing the vehicle 105, as discussed above.

Additionally, or alternatively, upon determining the confirmation confidence score is less than or equal to the second confidence threshold, the vehicle computer 110 can determine to provide the confirmation confidence score to one or more remote computers 140. In this situation, the vehicle computer 110 can generate an authorization message 310. Similar to the request message 300, the authorization message 310 includes a header 311 and a payload 312, including payload segments 313 (see FIG. 3C). The header 311 of the authorization message 310 may include a message type, a message size, etc. The payload 312, e.g., in a specified payload segment 313, includes a request for a user input that specifies the user status. Additionally, the payload 312, e.g., in another specified payload segment 313, may include the challenge biometric data for the user. The vehicle computer 110 can then provide the authorization message 310 to one or more remote computers 140 (e.g., a portable device associated with another user that is authorized), e.g., as discussed above regarding providing the request message 300. The remote computer(s) 140 can provide a response message 315 in response to the authorization message 310, as discussed below.

Upon receiving the response message 315, the vehicle computer 110 can determine the user status for the user. For example, the vehicle computer 110 can access the payload 317, e.g., a specified payload segment 318, and retrieve the user status. Upon determining that the user status is "authorized," the vehicle computer 110 can control the vehicle 105 based on the user data for the user, as discussed above. Upon determining that the user status is "not authorized," the vehicle computer 110 can prevent the user from accessing the vehicle 105, as discussed above.

A remote computer 140 can receive the request message 300 from the vehicle computer 110. For example, the authorized portable device 145 can monitor the network 135 to detect the request message 300. Upon receiving the request message 300, the authorized portable device 145 can access the payload 302, e.g., a specified payload segment 303, and retrieve the challenge biometric data for the user. The remote computer 140 can then biometrically authorize the user based on the challenge biometric data and the user data. That is, the remote computer 140 can determine a remote confidence score for the challenge biometric data, e.g., in substantially the same manner as discussed above regarding determining a confidence score for the challenge biometric data.

Upon determining the remote confidence score, the remote computer 140 can generate the reply message 305. Similar to the request message 300, the reply message 305 includes a header 306 and a payload 307, including payload segments 308 (see FIG. 3B). The header 306 of the reply message 305 may include a message type, a message size, etc. The payload 307, e.g., in a specified payload segment 308, includes the remote confidence score. The remote computer 140 can then provide the reply message 305 to the vehicle computer 110, e.g., as discussed above regarding providing the request message 300.

The remote computer 140 may be programmed to receive the authorization message 310 from the vehicle computer 110. For example, the remote computer 140 can monitor the network 135 to detect the authorization message 310. Upon receiving the authorization message 310, the remote computer 140 can actuate the HMI to request a sixth user input specifying the user status (See FIG. 4). For example, the remote computer 140 can actuate and/or instruct the HMI to display virtual buttons that another user can select to specify the user status. In other words, the HMI may activate sensors that can detect the other user selecting the virtual button to specify the user status for the user.

Upon detecting the sixth user input, the remote computer 140 can generate the response message 315 based on the sixth user input. Similar to the request message 300, the response message 315 includes a header 316 and a payload 317, including payload segments 318 (see FIG. 3D). The header 316 of the response message 315 may include a message type, a message size, etc. The payload 317, e.g., in a specified payload segment 318, includes the sixth user input. The remote computer 140 can then provide the response message 315 to the vehicle computer 110, e.g., as discussed above regarding providing the request message 300.

Figure 5:
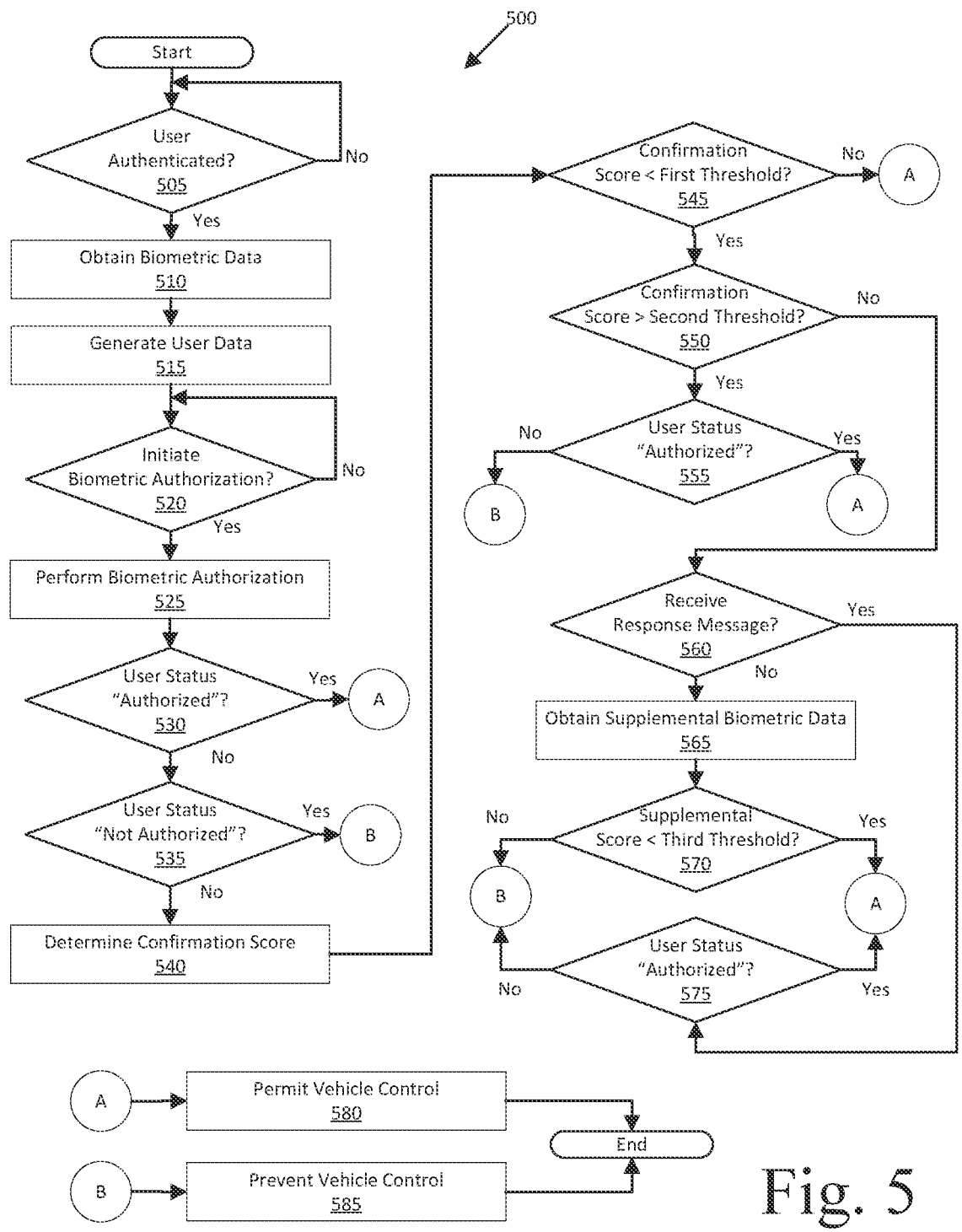
FIG. 5 is a flowchart of an example process for biometrically authorizing a user in a vehicle computer.

FIG. 5 is a diagram of an example process 500 executed in a vehicle computer 110 according to program instructions stored in a memory thereof for biometrically authorizing a user. Process 500 includes multiple blocks that can be executed in the illustrated order. Process 500 could alternatively or additionally include fewer blocks or can include the blocks executed in different orders.

Process 500 begins in a block 505. In the block 505, the vehicle computer 110 determines whether a user is authenticated. The vehicle computer 110 can authenticate the user based on, e.g., identifying information for the user or detecting an authorized portable device 140, as discussed above. If the vehicle computer 110 authenticates the user, then the process 500 continues in a block 510. Otherwise, the process 500 remains in the block 505.

In the block 510, the vehicle computer 110 actuates one or more sensors 115 to obtain enrollment biometric data for the user. The vehicle computer 110 can obtain the enrollment biometric data in response to receiving a second user input, e.g., via an HMI 118, specifying to initiate biometric enrollment for the user, as discussed above. The vehicle computer 110 can obtain one or more types of biometric data for the user, as discussed above. The process 500 continues in a block 515.

In the block 515, the vehicle computer 110 generates user data for the user. That is, the vehicle computer 110 associates the biometric data obtained in the block 510 with the user, as discussed above. Additionally, the vehicle computer 110 can provide the user data to remote computers 140 on an authorization network 111, as discussed above. The process 500 continues in a block 520.

In the block 520, the vehicle computer 110 determines whether to initiate biometric authorization. The vehicle computer 110 can initiate biometric authorization based on detecting a user approaching the vehicle 105 via sensor 115 data, as discussed above. If the vehicle computer 110 detects the user approaching the vehicle 105, then the process 500 continues in a block 525. Otherwise, the process 500 remains in the block 520.

In the block 525, the vehicle computer 110 performs biometric authorization using challenge biometric data for the user, as discussed above. The vehicle computer 110 actuates one or more sensors 115 to obtain the challenge biometric data for the user, as discussed above. The vehicle computer 110 determines a confidence score for the challenge biometric data by performing biometric authorization, as discussed above. The process 500 continues in a block 530.

In the block 530, the vehicle computer 110 determines whether a user status for the user is "authorized." To determine whether the user status is "authorized," the vehicle computer 110 compares the confidence score for the challenge biometric data to a first confidence threshold, as discussed above. If the confidence score for the challenge biometric data is greater than or equal to the first confidence threshold, then the vehicle computer 110 determines that the user status is "authorized." In this situation, the process 500 continues in a block 580. Otherwise, the process 500 continues in a block 535.

In the block 535, the vehicle computer 110 determines whether a user status for the user is "not authorized." To determine whether the user status is "not authorized," the vehicle computer 110 compares the confidence score for the challenge biometric data to a second confidence threshold, as discussed above. If the confidence score for the challenge biometric data is less than or equal to the second confidence threshold, then the vehicle computer 110 determines that the user status is "not authorized." In this situation, the process 500 continues in a block 585. Otherwise, the process 500 continues in a block 540.

In the block 540, the vehicle computer 110 determines a confirmation confidence score for the challenge biometric data based on one or more remote confidence scores received from respective remote computers 140. As discussed above, the vehicle computer 110 can provide a request message 300 to each of the remote computers 140 on the authorization network 111. In response to receiving reply messages 305 from one or more of the remote computers 140, the vehicle computer 110 can determine the confirmation confidence score based on corresponding remote confidence scores included in the respective reply messages 305, e.g., by using Equation 1, as discussed above. The process 500 continues in a block 545.

In the block 545, the vehicle computer 110 determines whether the confirmation confidence score is less than the first confidence threshold. The vehicle computer 110 compares the confirmation confidence score to the first confidence threshold. If the confirmation confidence score is less than the first confidence threshold, then the process 500 continues in a block 550. Otherwise, the vehicle computer 110 determines that the user status for the user is "authorized," and the process 500 continues in the block 580.

In the block 550, the vehicle computer 110 determines whether the confirmation confidence score is greater than the second confidence threshold. The vehicle computer 110 compares the confirmation confidence score to the second confidence threshold. If the confirmation confidence score is greater than the second confidence threshold, then the process 500 continues in a block 555. Otherwise, the process 500 continues in a block 560. Additionally, the vehicle computer 110 can provide an authorization message 310 to an authorized portable device 140, as discussed above.

In the block 555, the vehicle computer 110 determines whether the user status is "authorized" based on an authenticator. The vehicle computer 110 can determine the user status based on detecting a presence or an absence of the authenticator, as discussed above. Additionally, the vehicle computer 110 may control the vehicle 105 based on a predetermined user authorization, as discussed above. If the vehicle computer 110 detects the authenticator, then the vehicle computer 110 determines that the user status is "authorized." In this situation, the process 500 continues in the block 580. If the vehicle computer 110 detects an absence of the authenticator, then the vehicle computer 110 determines that the user status is "not authorized." In this situation, the process 500 continues in the block 585.

In the block 560, the vehicle computer 110 determines whether a response message 315 is received from the authorized portable device 140. The vehicle computer 110 can monitor the network 135 to detect the response message 315, as discussed above. If the response message 315 is received, then the process 500 continues in a block 575. Otherwise, the process 500 remains in a block 565.

In the block 565, the vehicle computer 110 obtains supplemental biometric data for the user. As set forth above, supplemental biometric data herein means a different type of biometric data than the challenge biometric data. The vehicle computer 110 can actuate sensor(s) 115 positioned to face the user outside the passenger cabin 200, i.e., external sensors 115a, to obtain the supplemental biometric data, as discussed above. The process 500 continues in a block 570.

In the block 570, the vehicle computer 110 determines whether a confidence score for the supplemental biometric data is less than a third confidence threshold. The vehicle computer 110 can determine the confidence score for the supplemental biometric data, as discussed above. The third confidence threshold is greater than the first confidence threshold, as set forth above. The vehicle computer 110 can then compare the confidence score for the supplemental biometric data to the third confidence threshold. If the confidence score for the supplemental biometric data is less than the third confidence threshold, then the vehicle computer 110 can determine that the user status is "not authorized." In this situation, the process 500 continues in the block 585. Otherwise, the vehicle computer 110 can determine that the user status is "authorized," and the process 500 continues in the block 580.

In the block 575, the vehicle computer 110 determines whether the user status is "authorized" based on the response message 315. The vehicle computer 110 can access a payload 317 of the response message 315 to retrieve the user status, as discussed above. If the vehicle computer 110 determines that the user status is "authorized," then the process 500 continues in the block 580. Otherwise, the process 500 continues in the block 585.

In the block 580, the vehicle computer 110 controls one or more vehicle components 125 based on the user data for the user, as discussed above. The process 500 ends following the block 580.

In the block 585, the vehicle computer 110 prevents the user from controlling and/or accessing the vehicle 105, as discussed above. The process 500 ends following the block 585.

Figure 6:
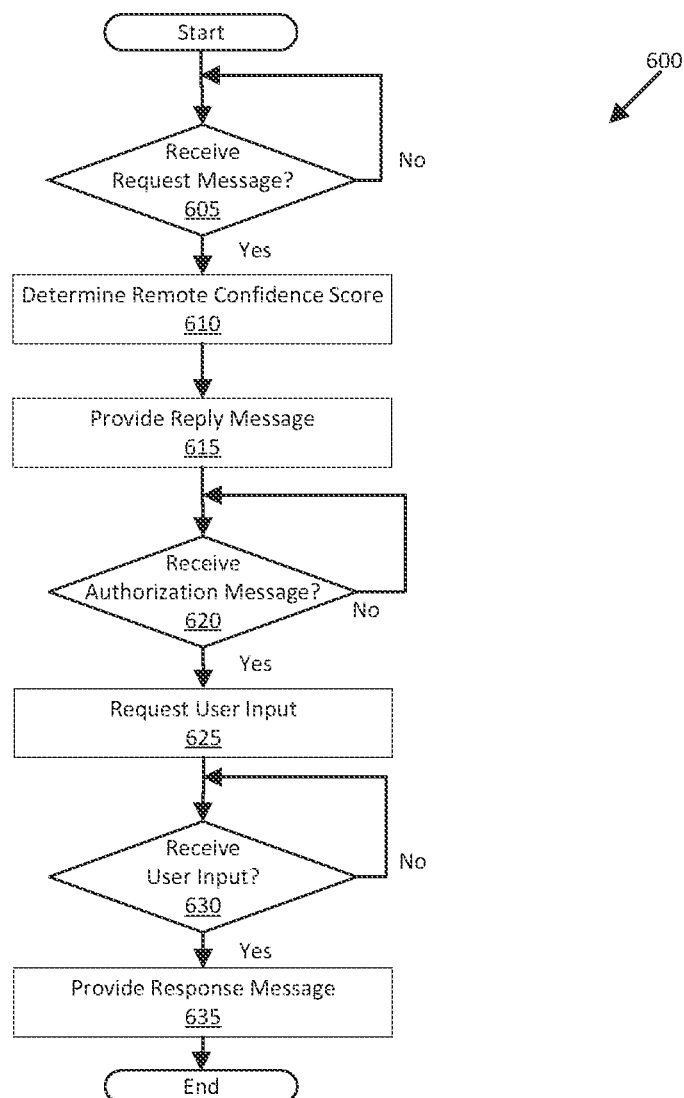
FIG. 6 is a flowchart of an example process for biometrically authorizing a user in a remote computer.

FIG. 6 is a diagram of an example process 600 executed in a remote computer 140, e.g., an authorized portable device 140 associated with an authorized user other than the user, according to program instructions stored in a memory thereof for biometrically authorizing a user. Process 600 includes multiple blocks that can be executed in the illustrated order. Process 600 could alternatively or additionally include fewer blocks or can include the blocks executed in different orders.

Process 600 begins in a block 605. In the block 605, the remote computer 140 determines whether a request message 300 is received from the vehicle computer 110. The remote computer 140 can monitor the network 135 to detect the request message 300, as discussed above. If the request message 300 is received, then the process 600 continues in a block 610. Otherwise, the process 600 remains in the block 605.

In the block 610, the remote computer 140 determines a remote confidence score for the challenge biometric data. That is, the remote computer 140 performs biometric authorization using challenge biometric data for the user, as discussed above. The remote computer 140 can retrieve the challenge biometric data from a payload 302 of the request message 300, as discussed above. The process 600 continues in a block 615.

In the block 615, the remote computer 140 generates and provides a reply message 305 to the vehicle computer 110, as discussed above. The remote computer 140 can generate the reply message 305 to include the remote confidence score, as discussed above. The process 600 continues in a block 620.

In the block 620, the remote computer 140 determines whether an authorization message 310 is received from the vehicle computer 110. The remote computer 140 can monitor the network 135 to detect the authorization message 310, as discussed above. If the authorization message 310 is received, then the process 600 continues in a block 625. Otherwise, the process 600 remains in the block 620.

In the block 625, the remote computer 140 can request a sixth user input. That is, the remote computer 140 can actuate the HMI to request the sixth user input specifying the user status, as discussed above. The process 600 continues in a block 630.

In the block 630, the remote computer 140 determines whether the sixth user input is received. Upon detecting the sixth user input, the HMI can provide the sixth user input to the remote computer 140, as discussed above. If the remote computer 140 receives the sixth user input, then the process 600 continues in a block 635. Otherwise, the process 600 remains in the block 630.

In the block 635, the remote computer 140 generates and provides a response message 315 to the vehicle computer 110, as discussed above. The remote computer 140 can generate the response message 315 to include the user status, as discussed above. The process 600 ends following the block 635.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board first computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising a computer including a processor and a memory, the memory storing instructions executable by the processor programmed to:
   upon determining a confidence score for challenge biometric data for a user of an object is less than a first confidence threshold, determine a confirmation confidence score for the challenge biometric data based on a remote confidence score for the challenge biometric data received from a remote computer;
   upon determining that the confirmation confidence score is greater than a second confidence threshold, determine a user status of the user based on an authenticator, wherein the user status is one of authorized or not authorized, and the second confidence threshold is less than the first confidence threshold;
   upon determining that the confirmation confidence score is less than or equal to the second confidence threshold, determine the user status based on supplemental biometric data; and
   control object components based on the user status.

2. The system of claim 1, wherein the instructions further include instructions to determine the user status is authorized based on the confidence score being greater than or equal to the first confidence threshold.

3. The system of claim 1, wherein the instructions further include instructions to determine the user status is not authorized based on the confidence score being less than or equal to the second confidence threshold.

4. The system of claim 1, wherein the instructions further include instructions to determine the user status is authorized based on the confirmation confidence score being greater than or equal to the first confidence threshold.

5. The system of claim 1, wherein the instructions further include instructions to determine the first confidence threshold or the second confidence threshold based on a location of the object.

6. The system of claim 1, wherein the instructions further include instructions to determine the first confidence threshold or the second confidence threshold based on a time of day.

7. The system of claim 1, wherein the instructions further include instructions to determine the first confidence threshold or the second confidence threshold based on environmental conditions around the object.

8. The system of claim 1, wherein the instructions further include instructions to provide, to a plurality of remote computers, a request for respective remote confidence scores in response to determining the confidence score is less than the first confidence threshold, wherein the plurality of remote computers includes the remote computer.

9. The system of claim 8, wherein the instructions further include instructions to determine the confirmation confidence score based additionally on a number of remote confidence scores received from the plurality of remote computers and a number of remote computers.

10. The system of claim 1, wherein the instructions further include instructions to request a response from the remote computer based on the confirmation confidence score being less than or equal to the second confidence threshold.

11. The system of claim 10, wherein the instructions further include instructions to determine the user status based on the response.

12. The system of claim 1, wherein the instructions further include instructions to determine at least one of the first confidence threshold or the second confidence threshold based on a user input.

13. The system of claim 1, wherein the instructions further include instructions to, upon determining that the user status is authorized, permit the user to access the object.

14. The system of claim 1, wherein the instructions further include instructions to determine the user status is authorized based on detecting the authenticator.

15. The system of claim 1, wherein the instructions further include instructions to determine the user status is not authorized based on detecting an absence of the authenticator.

16. The system of claim 1, wherein the instructions further include instructions to determine the user status is authorized based on determining a confidence score for the supplemental biometric data is greater than or equal to a third confidence threshold, wherein the third confidence threshold is greater than the first confidence threshold.

17. The system of claim 1, wherein the instructions further include instructions to determine the user status is not authorized based on determining a supplemental confidence score for the supplemental biometric data is less than a third confidence threshold, wherein the third confidence threshold is greater than the first confidence threshold.

18. A method, comprising:
- upon determining a confidence score for challenge biometric data for a user of an object is less than a first confidence threshold, determining a confirmation confidence score for the challenge biometric data based on a remote confidence score for the challenge biometric data received from a remote computer;
- upon determining that the confirmation confidence score is greater than a second confidence threshold, determining a user status of the user based on an authenticator, wherein the user status is one of authorized or not authorized, and the second confidence threshold is less than the first confidence threshold;
- upon determining that the confirmation confidence score is less than or equal to the second confidence threshold, determining the user status based on supplemental biometric data; and
- controlling object components based on the user status.

19. The method of claim 18, further comprising determining the first confidence threshold or the second confidence threshold based on at least one of a location of the object, a time of day, or environmental conditions around the object.

20. The method of claim 18, further comprising, upon determining that the user status is authorized, permitting the user to access the object.

* * * * *